United States Patent [19]

Eidsmore

[11] Patent Number: 5,033,505
[45] Date of Patent: Jul. 23, 1991

[54] PRESSURE REGULATOR AND METHOD OF ASSEMBLING SAME

[75] Inventor: Paul G. Eidsmore, Scotts Valley, Calif.

[73] Assignee: Nupro Company, Willoughby, Ohio

[21] Appl. No.: 413,315

[22] Filed: Sep. 27, 1989

Related U.S. Application Data

[63] Continuation-in-part of Ser. No. 213,630, Jun. 30, 1988, abandoned, which is a continuation of Ser. No. 826,021, Feb. 4, 1986, abandoned, which is a continuation-in-part of Ser. No. 826,022, Feb. 4, 1986, abandoned, which is a continuation-in-part of Ser. No. 675,825, Jan. 28, 1984, Pat. No. 4,624,443.

[51] Int. Cl.⁵ .............................................. G05D 16/02
[52] U.S. Cl. ................................ 137/505.39; 137/906; 251/64; 251/84
[58] Field of Search ....................... 137/505.39, 505.32, 137/906; 251/84, 64, 87

[56] References Cited

U.S. PATENT DOCUMENTS

| | | |
|---|---|---|
| 942,360 | 12/1909 | Wilkins . |
| 1,190,514 | 7/1916 | Cash . |
| 1,658,951 | 2/1928 | Stitt . |
| 1,900,514 | 3/1933 | McLean . |
| 2,047,101 | 7/1936 | Grove ............................ 137/505.37 |
| 2,152,781 | 4/1939 | Wile . |
| 2,202,313 | 5/1940 | Grove . |
| 2,235,304 | 3/1941 | Toussaint . |
| 2,261,364 | 11/1941 | Grove ............................ 137/906 X |
| 2,272,243 | 2/1942 | Jacobsson et al. ............ 137/505.42 |
| 2,285,049 | 6/1942 | Parks .......................... 137/505.26 X |
| 2,322,468 | 6/1943 | Redrup . |
| 2,333,401 | 11/1943 | Woods . |
| 2,436,522 | 2/1948 | Meidenbauer, Jr. . |
| 2,478,040 | 8/1949 | Campbell, Jr. et al. . |
| 2,591,407 | 4/1952 | Cornelius . |
| 2,645,884 | 7/1953 | Kellie . |
| 2,650,455 | 9/1953 | Jacobsson et al. . |
| 2,660,834 | 12/1953 | MacGlashan ................ 137/505.39 |
| 2,667,895 | 2/1954 | Pool et al. . |
| 2,702,561 | 2/1955 | Geffroy . |
| 2,721,576 | 10/1955 | Grove et al. ................... 137/906 X |
| 2,747,607 | 5/1956 | Matasovic ..................... 137/505.42 |
| 2,748,792 | 6/1956 | Davis . |
| 2,918,930 | 12/1959 | Jansen . |
| 2,925,987 | 2/1960 | Priesmeyer .................. 251/335.3 X |
| 2,981,280 | 4/1961 | Cornelius . |
| 2,981,281 | 4/1961 | Peras ............................ 137/505.37 |
| 3,259,144 | 7/1966 | Taplin .............................. 137/557 |
| 3,276,470 | 10/1966 | Griffing ........................ 137/505.15 |
| 3,286,726 | 11/1966 | Guy ................................ 251/64 X |
| 3,319,649 | 5/1967 | Cummins . |
| 3,545,339 | 12/1970 | Sickmeier . |
| 3,552,431 | 1/1971 | Schmidlin . |
| 3,709,242 | 1/1973 | Chase . |
| 3,759,294 | 9/1973 | Kongelka . |
| 3,913,885 | 10/1975 | Greenwood et al. ........... 251/64 X |
| 4,128,105 | 12/1978 | Follett . |
| 4,287,909 | 9/1981 | Tompson et al. ............. 137/505.37 |
| 4,481,974 | 11/1984 | Schmitt ............................ 251/64 X |
| 4,741,306 | 5/1988 | Affeldt et al. ................... 251/87 X |
| 4,852,606 | 8/1989 | Heneker . |

FOREIGN PATENT DOCUMENTS

| | | | |
|---|---|---|---|
| 558542 | 1/1944 | United Kingdom | 137/505.42 |
| 574691 | 1/1946 | United Kingdom | 251/87 |

Primary Examiner—Stephen M. Hepperle
Attorney, Agent, or Firm—Fay, Sharpe, Beall, Fagen, Minnich & McKee

[57] ABSTRACT

A pressure regulator includes a hermetically sealed housing that limits the potential for leak paths to atmosphere or exterior to the housing. The regulator includes a dampening arrangement for limiting oscillations during high flow rates. A stem clip secures a poppet assembly to a movable member of the regulator. The stem clip permits radial movement of the poppet assembly to facilitate centering of the poppet assembly relative to a valve seat. The poppet assembly includes a self-tapping poppet to precisely set the opening between the poppet and valve seat irrespective of tolerance stackup.

25 Claims, 6 Drawing Sheets

PRESSURE REGULATOR AND METHOD OF ASSEMBLING SAME

BACKGROUND OF THE INVENTION

This application is a continuation-in-part of Ser. No. 213,630 filed June 30, 1988, now abandoned, which is a continuation of Ser. No. 826,021 filed Feb. 4, 1986, now abandoned, which is a continuation-in-part of Ser. No. 826,022, filed Feb. 4, 1986, now abandoned, which is a continuation-in-part of Ser. No. 675,825, filed Nov. 28, 1984, now U.S. Pat. No. 4,624,443.

This invention pertains to the art of fluid handling components and more particularly to fluid pressure regulators. The invention is applicable to systems that operate from a source of fluid under high pressure and that require a low, substantially steady pressure, independently of variations in the fluid pressure at the source. Although the invention will be described with particular reference to this type of system, it will be appreciated that the invention has broader applications and may be advantageously employed in other environments and applications requiring regulation of fluid pressure.

In fluid systems supplied, for example, from a cylinder of compressed fluid at high pressures, it is common practice to install a pressure regulator downstream of a shutoff valve associated with the cylinder. The pressure regulator minimizes the number of components and couplings of the system that must operate at potentially hazardous high pressures. Further, the pressure regulator assures a supply of compressed fluid at a substantially steady, low pressure despite the drop in pressure of the fluid in the cylinder as the fluid is released or used over time.

Prior pressure regulators have suffered from one or more drawbacks some of which will be discussed in general terms below. Various pressure regulators have attempted to address selected ones of these features but no known regulator is deemed to meet all of the following requirements in an effective manner.

Typical regulators employ a bellows or diaphragm that is secured along a peripheral edge to the housing. A potential leak path to outside atmosphere may be established if the diaphragm or bellows fails. When handling high pressure and extremely toxic fluids, containment of the fluid is a primary concern. Therefore, limiting the number of seals or flexible membranes between the system media and atmosphere is another important goal. Under high flow rates, available pressure regulators have a tendency to audibly buzz and physically oscillate. Oscillations of the pressure regulator can result in variations in the downstream pressure, even resulting in pressure spikes through the system. Apart from the annoyance of the audible buzz, the pressure spikes can have an adverse effect on the downstream equipment.

Overpressure situations may also adversely effect operation of a pressure regulator. For example, a bellows may be so crimped or distorted that orientation of the one end carrying the sealing mechanism may be effected which, in turn, can adversely impact on fluid pressure regulation. Still another concern, if the bellows fails due to overpressure or for another reason, is that a poppet or valve member of the regulator would be left in an open position and not constrict or regulate flow at all. Obviously, such a situation would be highly undesirable.

Somewhat related to the general goal of a predictable outlet pressure value is the need to improve the shutoff characteristic of the regulator. In this regard, available pressure regulators do not adequately adapt to tolerance stack-up problems or other alignment problems that may result during use of the regulator.

Yet another continuing problem is the difficulty in repairing known pressure regulator constructions. Oftentimes many components of the regulator may still be fully functional and only a single component requires repair. In such situations, it is desirable that the component be easily replaced without concern toward the overall effect on tolerances and subsequent operation of the regulator.

SUMMARY OF THE INVENTION

The present invention contemplates a new and improved pressure regulator and method of assembling same that overcomes all of the above-referenced problems and others and provides a desired outlet pressure irregardless of fluctuations in the system.

According to the present invention, an inlet and outlet communicate with a chamber defined in the pressure regulating housing. Means for selectively regulating fluid flow between the inlet and outlet includes means for dampening movement to limit oscillations under selected conditions.

According to another aspect of the invention, means for centering a poppet relative to a valve seat is provided to improve shutoff characteristics of the regulator.

According to yet another aspect of the invention, a poppet is self-tapping on the stem to facilitate makeup and accurate control of the pressure drop across the valve seat.

According to a still further aspect of the invention, a continuous flow path is defined entirely around the bellows so that if failure of the bellows occurs, the regulator housing still remains hermetically sealed.

A principal advantage of the invention is the ability to accurately maintain an outlet pressure at a desired value.

Another advantage of the invention is the ability to compensate for tolerance stack-up problems.

A further advantage of the invention is the fail-safe arrangement that shuts off fluid flow should the bellows fail.

Another advantage is the stability of the pressure regulator at high flow rates.

Yet other advantages reside in the preset, nonadjustable, and tamperproof setting of the pressure regulator, maintaining accurate shutoff characteristics, and ease of repair.

Still another advantage is found in the ease of initially setting the poppet clearance relative to the valve seat.

Still other advantages of the invention will become apparent to those skilled in the art upon a reading and understanding of the following detailed description.

BRIEF DESCRIPTION OF THE DRAWINGS

The invention may take physical form in certain parts and arrangements of parts, preferred embodiments of which will be described in this specification and illustrated in the accompanying drawings which form a part hereof, and wherein.

DETAILED DESCRIPTION OF THE PREFERRED EMBODIMENTS AND METHOD

Figure 1:
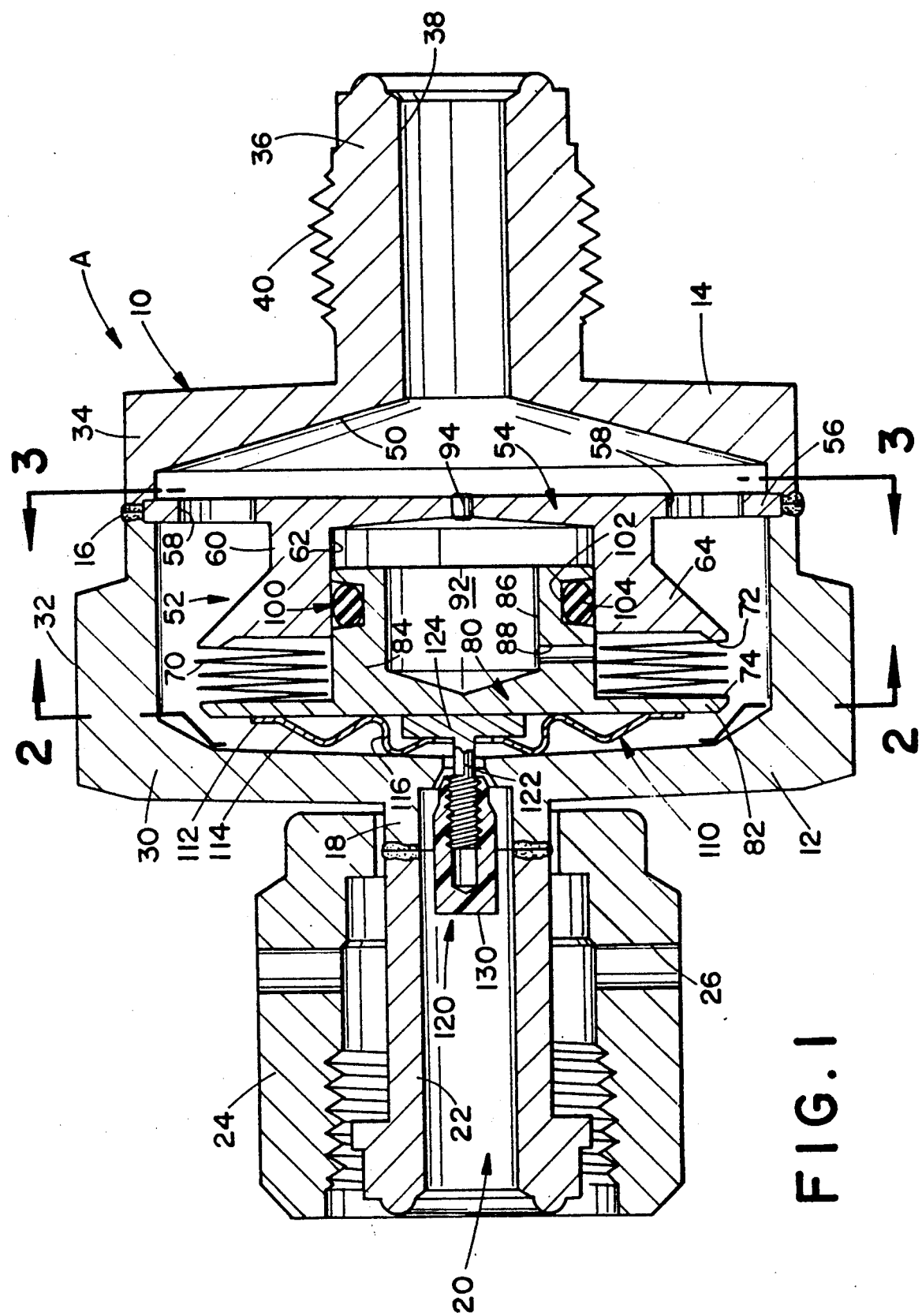
FIG. 1 is a longitudinal cross-sectional view of a pressure regulator in accordance with the subject invention.

Referring now to the drawings wherein the showings are only for purposes of illustrating the preferred embodiments and method of assembly and not for purposes of limiting same, the FIGURES show a pressure regulator A adapted to regulate fluid pressure in an associated fluid system. Although not shown, a source of fluid under high pressure is preferably disposed immediately upstream of the pressure regulator. Downstream of the regulator A is a tool or component (not shown) that requires fluid at low pressure. The subject pressure regulator selectively controls passage of fluid from the source to the downstream use.

More particularly, and with reference to FIGS. 1-4, the pressure regulator includes a body or housing 10 having a first portion 12 and a second portion 14. The first and second housing portions are integrally joined at an interface region 16 through a welding operation that will be described in greater detail below. The first housing portion includes a small diameter extension 18 that communicates with a fluid line or passage defining an inlet 20 to the regulator. As shown, the fluid line is a well known type of coupling member 22 that is secured by an encompassing connector such as nut 24 to the upstream portion of the fluid system. Preferably, the coupling member is welded to the extension 18 to hermetically seal the regulator. Further, the nut includes a generally radial passage 26 therethrough defining a test port to monitor the integrity of the seal between the extension and the fluid system. An enlarged diameter region 30 of the first housing portion extends axially from the extension. To facilitate connection with the fluid system, tool engaging surfaces such as wrench flats 32 (FIGS. 2-3) are provided along the periphery thereof.

As particularly shown in FIG. 1, the second housing portion 14 has a similar large diameter region 34 that integrally merges into a reduced diameter coupling member 36 defining outlet 38. The coupling member preferably includes an externally threaded region 40 to provide ease of connection with the downstream portion of the fluid system. Since the coupling member is a conventional structure, and one skilled in the art realizes that other coupling arrangements can be used without departing from the scope and intent of the subject invention, further discussion is deemed unnecessary.

The housing portions form a cavity or chamber 50 therein. The chamber is in continuous fluid communication with the outlet 38 and in selective communication with inlet 20. Communication with the inlet is controlled by regulating means 52 received in the chamber. More specifically, the regulating means includes a first or stationary portion 54 that is fixedly secured to the housing along a radially outer edge of a disc 56. The disc includes axial passages 58 that permit fluid flow therethrough. An axial sleeve 60 extends from the disc toward the inlet and includes a recess 62 for reasons which will become more apparent below. The sleeve also includes a shoulder 64 that increases in diameter as the sleeve extends axially toward the inlet.

An expansible member such as bellows 70 is secured at one end 72 to the shoulder 64. For high pressure applications, the bellows is defined by a series of substantially flat bellow discs that are alternately welded on the inside and outside to an adjacent disc.

A second end 74 of the bellows is secured to a second or movable portion 80 of the regulating means 52. More particularly, the movable portion has a disc 82 at one end to which the bellows second end 74 is welded. A reduced diameter cylindrical portion 84 is integrally formed with the disc and extends axially toward the outlet for close receipt in the recess 62 of the stationary portion. Preferably, the diametrical dimension of the cylindrical portion 84 also closely approximates the minimum diameter of the bellows to provide support therefor if required.

Figure 4:
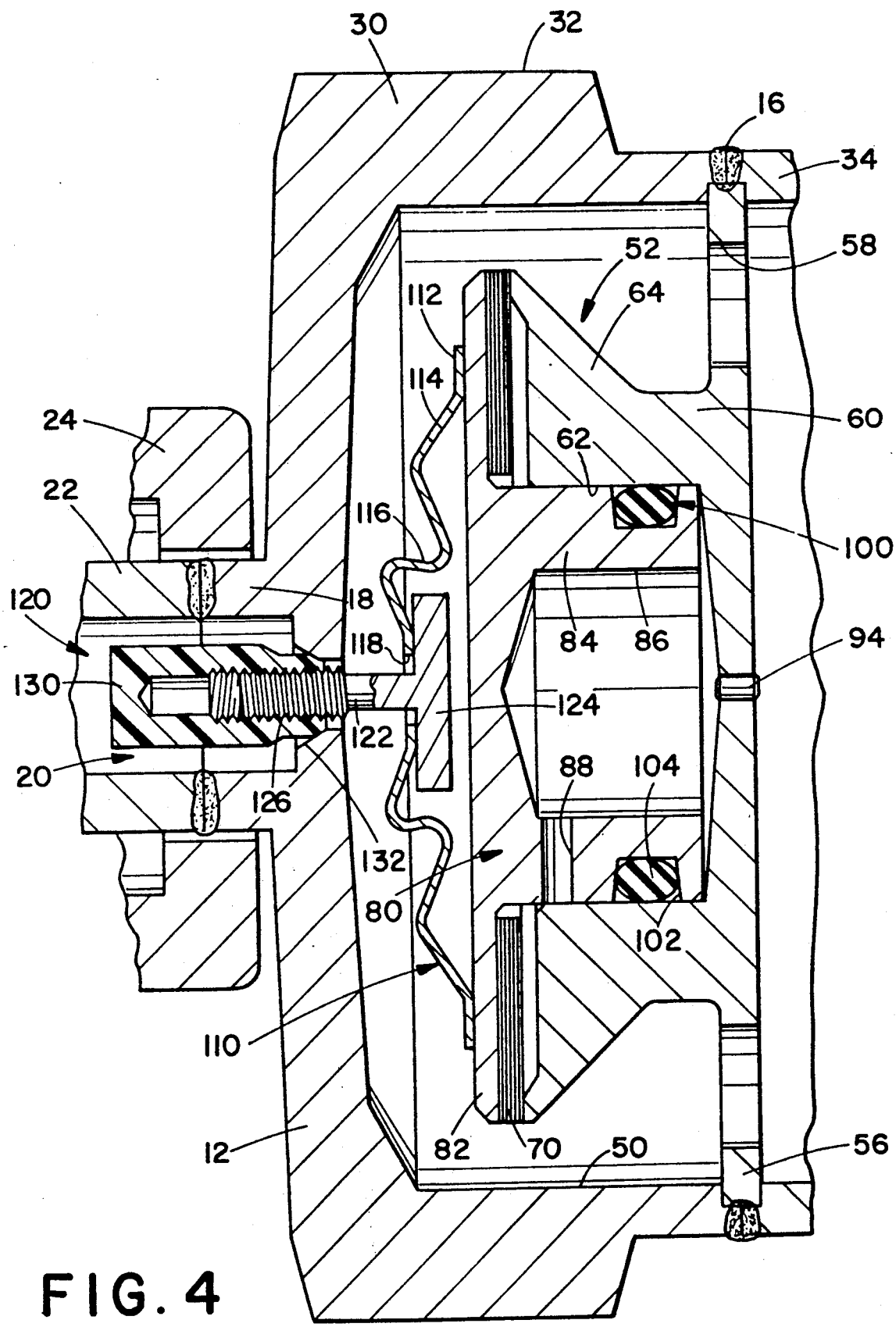
FIG. 4 is a partial, longitudinal cross-sectional view illustrating flexure of the stem clip that retains the poppet assembly.

A hollowed recess 86 is provided in the cylindrical portion and communicates with the bellows interior through radial opening 88 to define a closed cavity 92 in the regulating means as illustrated in FIGS. 1 and 4. The closed cavity receives a predetermined pressure charge therein that establishes the opening and closing pressure value of the regulator. A charging port 94 in the disc of the stationary portion permits the closed cavity to be pressurized and is then sealed to maintain the pressure charge therein. If a greater system fluid pressure exists in the housing chamber 50 than in the closed cavity, then the bellows is compressed and the poppet moves toward closure. Conversely, if fluid pressure in the chamber is less than that in the closed cavity, then the bellows will expand to permit flow.

To limit audible buzzing and associated fluctuations in the downstream fluid pressure associated with high flow rates, means 100 for dampening movement between the first and second portions of the regulating means is provided. In the preferred arrangement, the dampening means includes a circumferentially continuous groove 102 that receives a resilient member such as O-ring 104. The O-ring exerts a slight, controlled drag on the movement of the movable member relative to the stationary member thus limiting oscillations of the regulating means at high flow rates.

Figure 2:
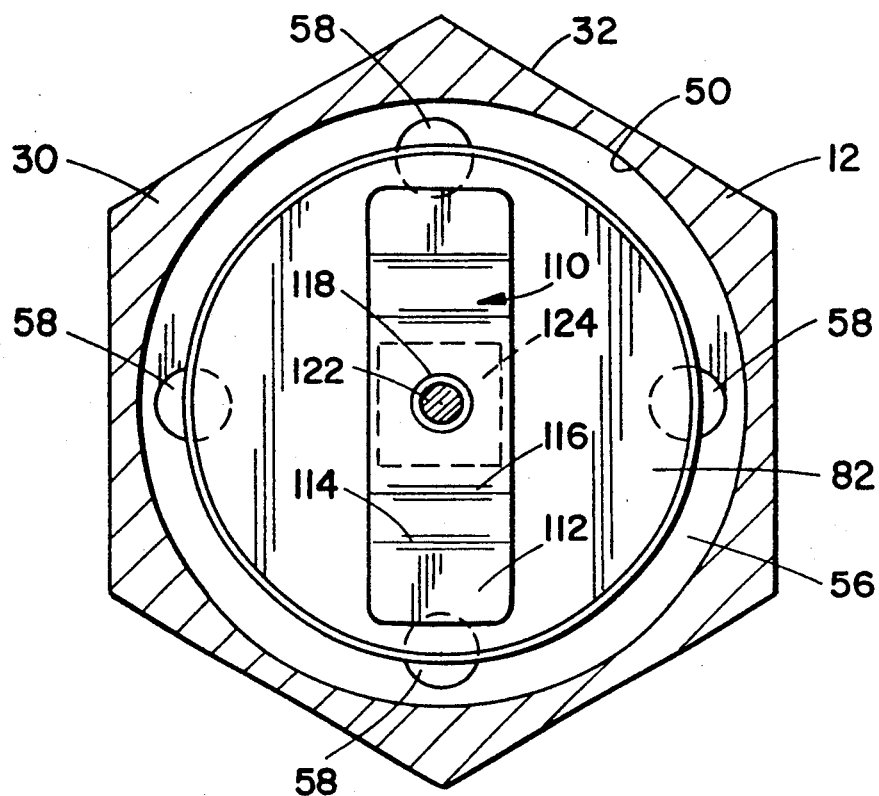
FIG. 2 is a cross-sectional view generally along the lines 2—2 of FIG. 1.
Figure 3:
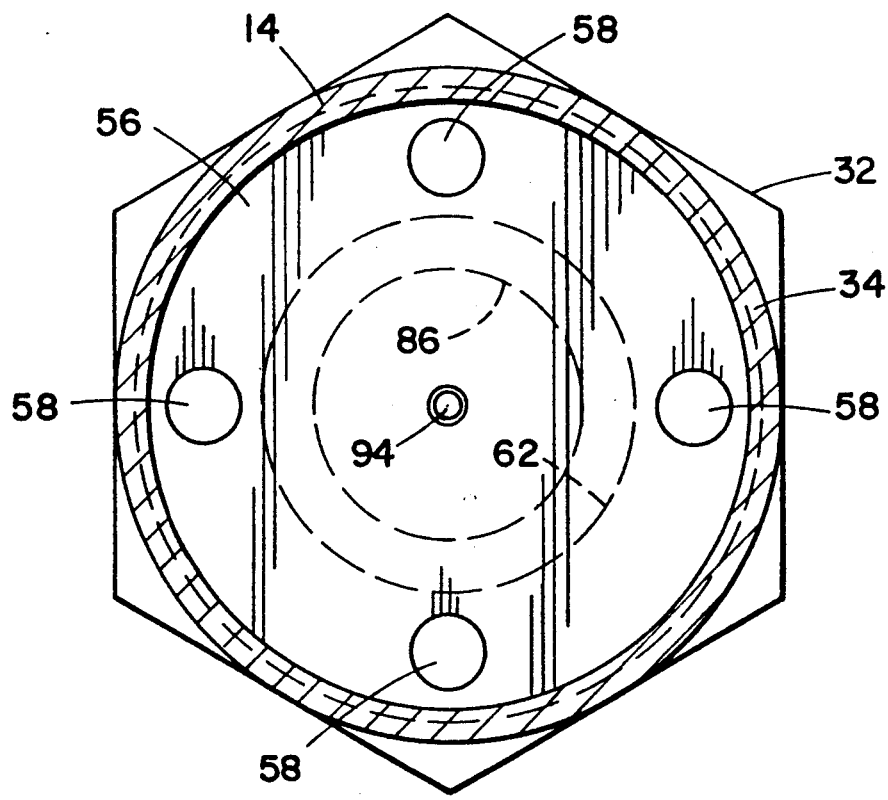
FIG. 3 is a cross-sectional view generally along the lines 3—3 of FIG. 1.

A stem clip 110 is attached to the inlet side of the disc. The stem clip is preferably oblong and symmetrically configured about the longitudinal axis as illustrated in FIGS. 1, 2 and 4. Due to the symmetrical arrangement, description of the lower half of the stem clip is applicable to the upper half unless noted otherwise. The stem clip is spot welded along an outer edge 112 to member 82. A central portion of the clip is thus adapted for selective flexing if required. A bend 114 is defined radially inward from the outer edge and the bend extends initially toward the inlet and then toward the regulating means. The stem clip is then bent again sharply toward the inlet to define an axial portion 116 that defines a stop limit for movement of the regulating means toward the inlet. Specifically, the stem clip abuttingly engages the housing adjacent the inlet under selected pressure conditions. The stem clip then is bent one more time toward the outlet and has a central opening 118 of a first predetermined dimension.

A poppet assembly 120 extends generally axially outward from the regulating means and into the inlet 20. The poppet assembly includes a stem 122 having an enlarged rectangular base 124 retained by the stem clip 110. An axial portion of the stem has a diameter sufficiently smaller than the first predetermined dimension of the central opening 118. These dimensional relationships permit radial movement of the poppet assembly relative to the stem clip, and, likewise, relative to the remainder of the regulating means as represented by the arrow and phantom views in FIG. 5. Particularly, the rectangular base 124 substantially prevents rotation of the poppet assembly relative to the stem clip due to engagement of the corners of the base with axial portions 116 of the clip. Nevertheless, there is substantial play to allow radial movement of the poppet assembly to overcome misalignment. The opposite end 126 of the stem is externally threaded and spans into the inlet.

Figure 5:
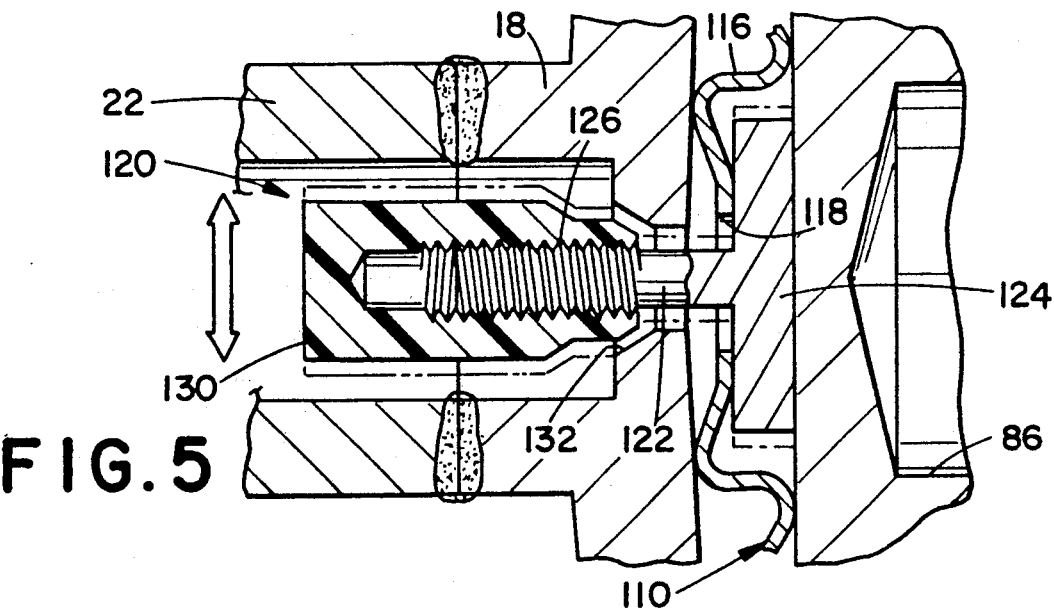
FIG. 5 is an enlarged cross-sectional view illustrating the range of radial movement of the poppet assembly.

A poppet 130 is threadedly received on the end 126 of he stem remote from the base. As shown in FIGS. 4 and 5, the poppet is entirely disposed in the inlet. In the preferred embodiment, the poppet is formed of a suitable seal material that has a hardness substantially less than the material forming the stem. Since the stem is externally threaded along one end 126, the poppet is tapped as it is advanced onto the stem. Further, because the poppet is self-tapping, a preferred material is one that seals or grips the threads on the stem. By way of example only, Kel-F (a registered trademark of Minnesota Mining and Manufacturing Company) is a preferred poppet material. The Kel-F material imposes a drag on the stem threads that provide a self-locking property. Further, this fluorocarbon product does not produce any shavings during the self-tapping process. This is important from the standpoint that shavings or other particles represent a potential contaminant in the fluid system that can interfere with proper seating of the poppet or operation of other components in the fluid system.

The poppet is sized to selectively seal with valve seat 132 defined at the intersection of the inlet with the chamber (FIG. 4). If the system fluid pressure in chamber 50 is greater than the preselected pressure charge in the regulating means, the poppet will be urged toward the valve seat. If the system fluid pressure is substantially greater than the pressure charge then the poppet will shut off fluid communication between the inlet and outlet. Once the fluid pressure in the chamber 50 subsides, the regulating means will unseat the poppet and again establish fluid flow (FIG. 1).

This pressure regulator will perform better than known regulators at high flow rates due to the incorporation of the dampening means. The slight drag imposed by the dampening means reduces the potential that pressure spikes will result downstream. Additionally, misalignment that might otherwise result from tolerance stackup is compensated for by the ability of the poppet assembly to move relative to the remainder of the regulating means. The stem allows the poppet to center itself on the valve seat which has a twofold effect. First, the shutoff characteristics of the regulator improve since the fluid opening between the poppet and valve seat is symmetrical. Secondly, the pressure drop across the regulator is reduced when a downstream valve or similar device is opened. Since the poppet can align itself with respect to the valve seat, less pressure is required to open the regulator since less pressure is required to close the regulator in the first place. Conversely stated, the regulator requires less pressure differential to seal the poppet against the valve seat so that the regulator responds more quickly to opening.

The regulator also has no seals or flexible membranes between the system media and atmosphere. This substantially reduces safety concerns associated with prior pressure regulators in which the rupture of a diaphragm or bellows could potentially release toxic fluid. Still another benefit of the described regulator is the fail-safe arrangement. Particularly, if the bellows fails, the poppet will close on the valve seat to prevent downstream equipment from being exposed to high pressure. The bellows has a spring rate that tends to flatten the bellows so that if the pressure in the bellows leaks out then the regulator moves toward a closed position.

The regulating means is also adapted to support the bellows and prevent total collapse thereof should the seat fail to shut off when, for example, a downstream valve is closed. This avoids damage to the bellows and makes repair of the regulator possible.

With reference to FIG. 4, the flexing of the stem clip is illustrated in greater detail. In a situation where the poppet has closed and the regulator has completely retracted, the central portion of the stem clip can flex or extend axially to prevent damage to the poppet assembly. Without the flexing action, the poppet could potentially be pulled or stripped from its threaded engagement with the stem. Such problems can be alleviated with the stem clip arrangement.

Figure 6:
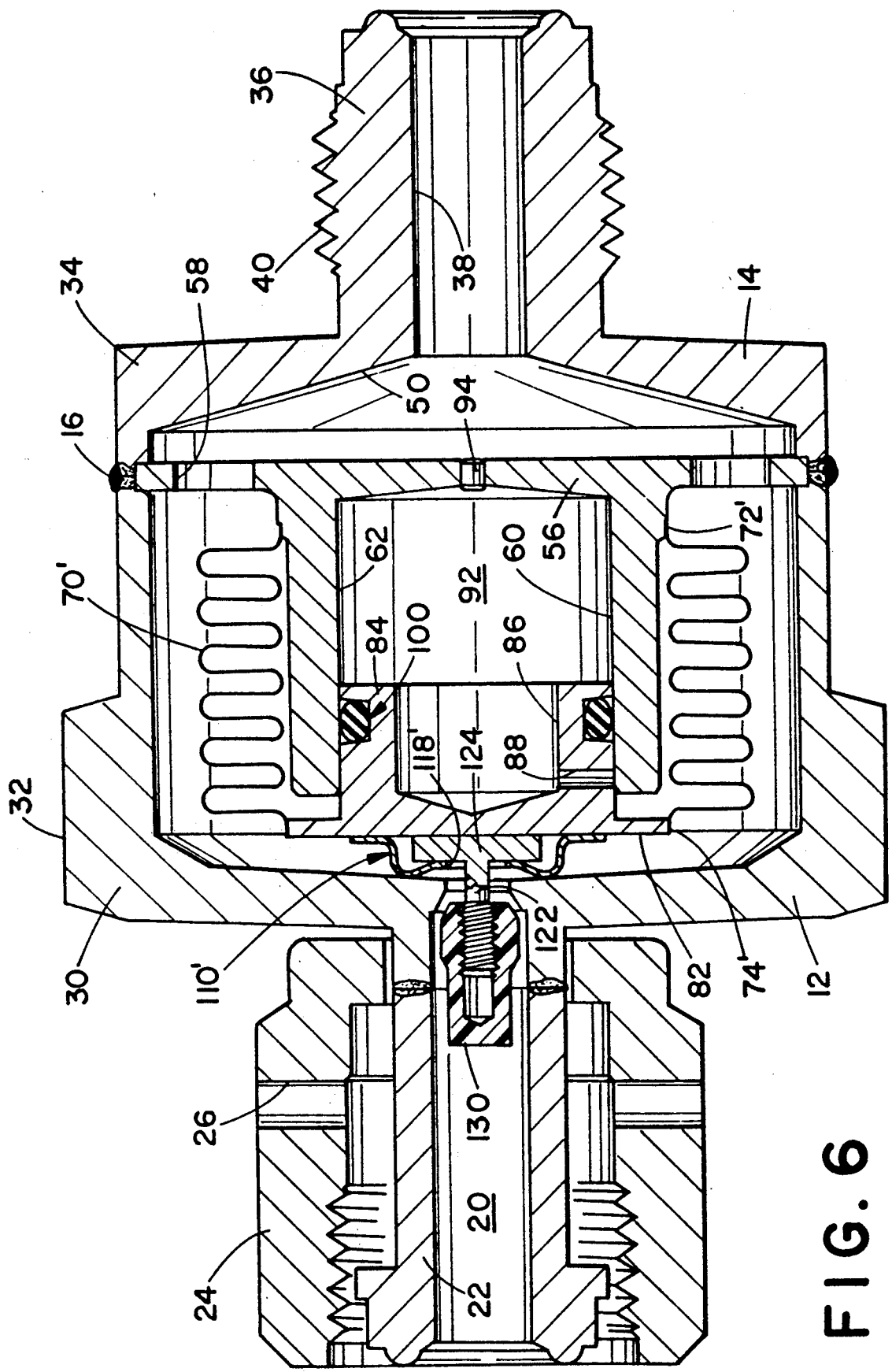
FIG. 6 is a longitudinal cross-sectional view of an alternate pressure regulator in accordance with the subject invention.

FIG. 6 shows a low pressure regulator that is substantially similar to the high pressure regulator described above. For purposes of brevity, and unless noted otherwise, the structure and function of the low pressure regulator is substantially the same so that like numbers with primed suffixes (') will refer to like parts to facilitate illustration and understanding. The bellows is not a series of individual welded discs but is substituted with a continuous bellows element 70'. The stem clip 110' is also altered in the low pressure regulator by eliminating the bend. Thus, the amount of flex or axial travel of the poppet assembly is limited to the flexibility of the clip around the central opening 118'.

Figure 8:
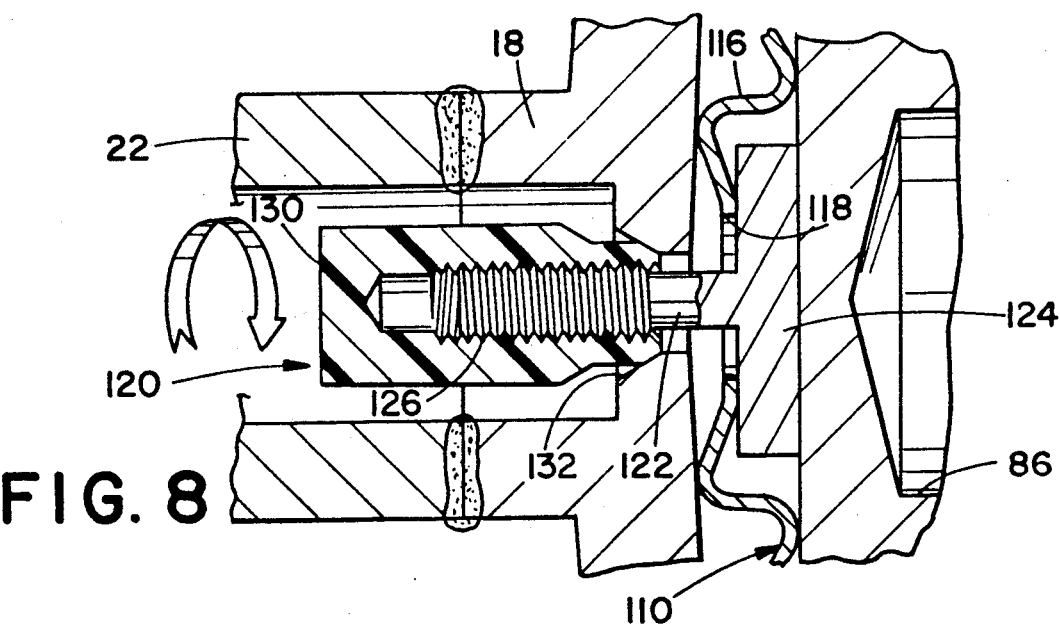
FIG. 8 illustrates intermediate steps of assembling the pressure regulator; and, FIG. 9 illustrates the final steps of assembling and setting the pressure regulator to a desired value.
Figure 9:
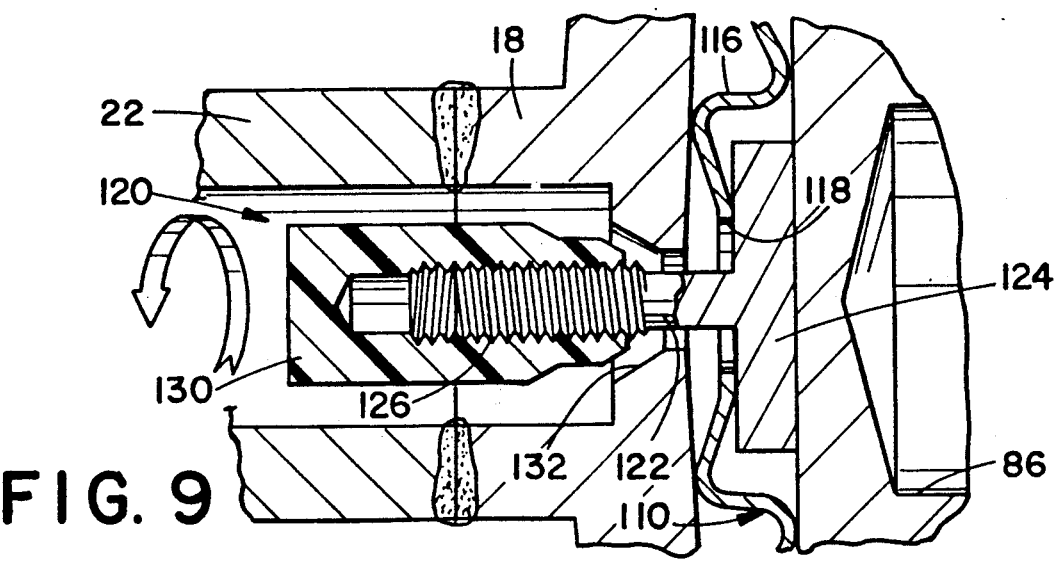
Figure 7:
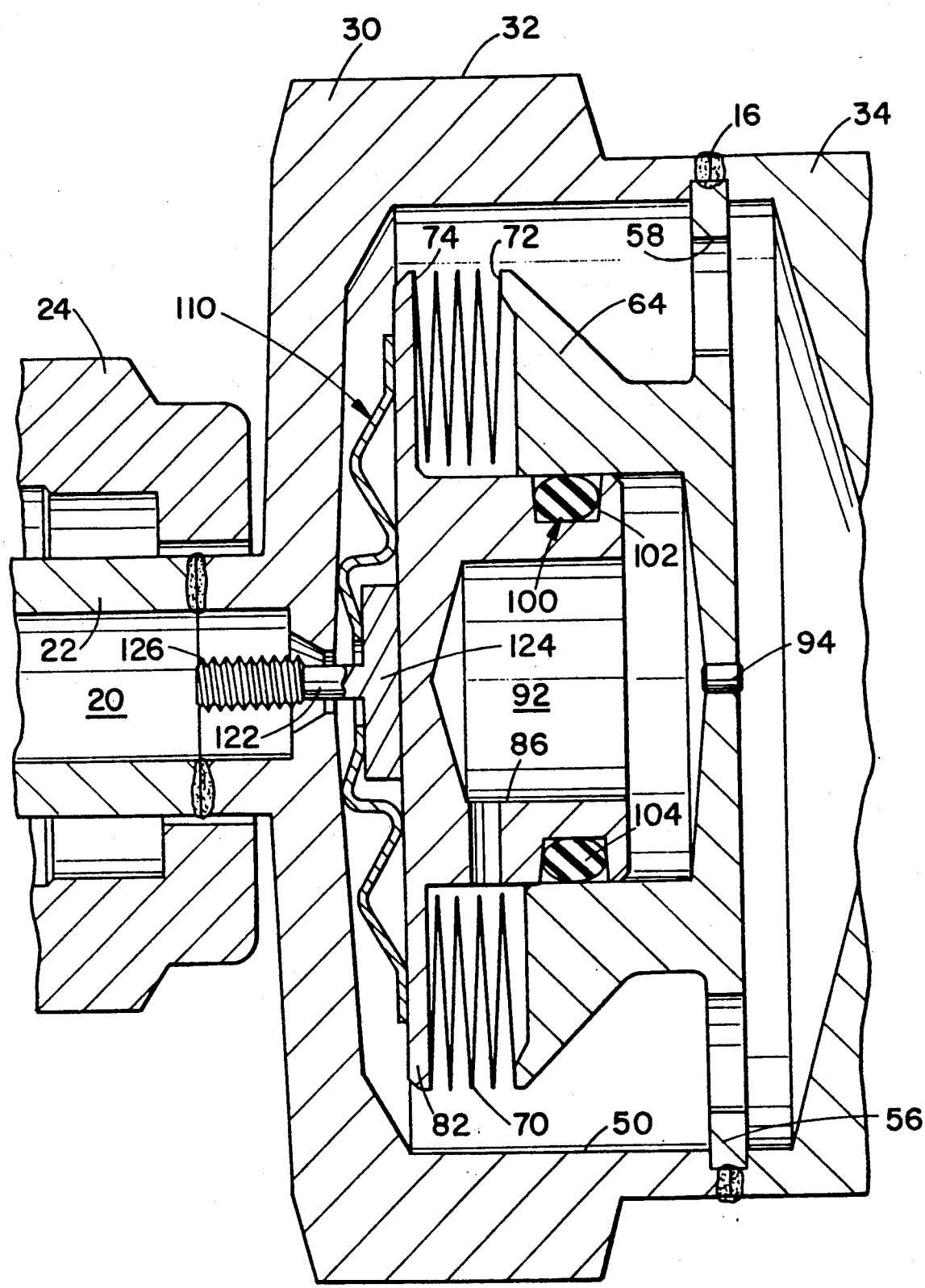
FIG. 7 represents initial steps in assembling the subject pressure regulator.

FIGS. 7-9 represent the novel method of assembling the pressure regulator. The first and second portions of the regulating means are previously secured together by welding opposite ends of the bellows to the shoulder 64 and disc 82, respectively. The stem 122 is also previously secured to the regulating means by means of the stem clip. A weld bead is formed on the outer periphery of the housing at the interface region 16 and extends radially inward to integrally secure the disc 56 between the housing portions. The closed cavity 92 is pressurized through charging port 94 and a weld bead or other suitable means for sealing the charging port provided. After charging and sealing, with the chamber at atmospheric pressure, the charged regulating means advances toward the inlet until the stem clip abuts the housing. The poppet 130 is then advanced onto the stem through a rotary tapping action until the poppet seals against the seat 132 (FIG. 8). A predetermined torque level will indicate seating of the poppet. Thereafter, the poppet is retracted as demonstrated in FIG. 9 by rotating the poppet in the opposite direction to unseat the poppet. Rotation of the stem is resisted by the rectangular stem base engaging the stem clip. Since the pitch of the stem thread is already known, a preselected number of turns of the poppet will precisely set the opening between the poppet and the valve seat. Thus, no matter what tolerance problems are encountered during makeup of the remainder of the regulator, the poppet opening will always be the same.

This method of assembling the pressure regulator is significant for at least two reasons. First, the outlet pressure will always be maintained at a predictable value. This eliminates problems related to a regulator being incorrectly set. Secondly, the pressure drop across the valve seat is accurately controlled despite axial tolerance stackups that occur in the assembly.

The invention has been described with reference to the preferred embodiments. Obviously modifications and alterations will occur to others upon a reading and understanding of this specification. For example, the disc 82 may be eliminated from the movable portion of the regulating means (FIG. 1). Instead of the bellows configurations described above, a flexible membrane such as a diaphragm could be secured along its periphery to the shoulder 64 of the sleeve 60. The diaphragm would preferably be a generally circular and axially interposed at its central region between the cylindrical portion 84 of the regulating means movable portion and the stem clip/stem 110, 122. Although such a modification to the pressure regulator would result in a regulator larger than the bellows embodiments described above, it would still be much more compact than conventional diaphragm-type regulators and probably less expensive to manufacture than the welded bellows arrangement of FIG. 1. The invention is intended to include the diaphragm type regulator, as well as similar modifications and alterations, insofar as they come within the scope of the appended claims or the equivalents thereof.

I claim:

1. A pressure regulator comprising:
   a housing having a chamber defined therein;
   an inlet and outlet operatively communicating with said chamber;
   means for selectively regulating fluid flow between said inlet and outlet, said regulating means including a movable pressure responsive member having a first portion secured in the chamber, and a second portion associated therewith and adapted for movement relative to the first portion, the first and second portions forming a closed cavity entirely defined in the chamber having a predetermined pressure charge therein that establishes the opening and closing pressure value of the regulator, the regulating means further including a resilient member disposed between the first and second portions for dampening movement of said regulating means to limit oscillations thereof under selected conditions.

2. The pressure regulator as defined in claim 1 wherein said regulating means includes a poppet assembly adapted for selective engagement with a valve seat defined between said inlet and outlet.

3. The pressure regulator as defined in claim 2 wherein said poppet assembly includes means for centering the poppet assembly relative to the valve seat.

4. The pressure regulator as defined in claim 3 wherein said centering means includes a stem having a poppet received on one end and an enlarged base portion defined at the other end, said stem being retained on said second portion by a clip having an opening substantially larger than a transverse dimension of said stem to permit transverse movement of said stem relative thereto.

5. The pressure regulator as defined in claim 4 wherein said clip limits relative rotation of said poppet.

6. The pressure regulator as defined in claim 2 further comprising means for adjusting the poppet assembly to closely control pressure drop across the valve seat.

7. A pressure regulator comprising:
   a housing having a chamber defined therein;
   an inlet and outlet operatively communicating with said chamber;
   means for selectively regulating fluid flow between said inlet and outlet, said regulating means including a closed cavity defined in the chamber and being substantially entirely enclosed by fluid as the fluid passes from the inlet to the outlet, the closed cavity having a predetermined pressure charge therein that establishes the opening and closing pressure value of the regulator, the regulating means further including a poppet assembly that opens and closes one of said inlet and outlet; and
   means for connecting said poppet assembly to said regulating means, said connecting means permitting selective movement therebetween.

8. The pressure regulator as defined in claim 7 wherein said connecting means is fixedly secured to said regulating means along an outer radial portion and retains said poppet assembly along a radial inner portion.

9. The pressure regulator as defined in claim 7 wherein said connecting means includes an opening adapted to receive said poppet assembly therethrough, said opening being sized to permit lateral movement of said poppet assembly relative to said regulating means.

10. The pressure regulator as defined in claim 7 further comprising means for limiting rotational movement between said regulating means and said poppet assembly.

11. The pressure regulator as defined in claim 10 wherein said rotational limiting means is defined by a generally rectangular end on said poppet assembly received in a generally rectangular cavity in said connecting means.

12. The pressure regulator as defined in claim 7 further comprising means for dampening movement of said regulating means to limit oscillations thereof under selected conditions.

13. The pressure regulator as defined in claim 12 wherein said regulating means includes first and second portions adapted for movement relative to one another, said dampening means including a resilient member interposed between said first and second portions.

14. A pressure regulator comprising:
    a housing having a chamber defined therein;
    an inlet and outlet operatively communicating with said chamber;
    means for selectively regulating fluid flow between said inlet and outlet, said regulating means including means for dampening movement of said regulating means to limit oscillations thereof under selected conditions; and
    a poppet assembly operatively associated with the regulating means adapted for selective engagement with a valve seat defined between said inlet and outlet, said poppet assembly includes means for centering the poppet assembly relative to the valve seat, the centering means including a stem having a poppet received on one end and an enlarged base portion defined at the other end, said stem being retained on said second portion by a clip having an opening substantially larger than a transverse dimension of said stem to permit transverse movement of said stem relative thereto.

15. The pressure regulator as defined in claim 14 wherein said regulating means includes a movable pressure responsive member having a first portion secured in said chamber, and a second portion associated therewith and adapted for movement relative to said first portion.

16. The pressure regulator as defined in claim 15 wherein said dampening means includes a resilient member disposed between said first and second portions.

17. The pressure regulator as defined in claim 14 wherein said clip limits relative rotation of said poppet.

18. The pressure regulator as defined in claim 14 further comprising means for adjusting the poppet assembly to closely control pressure drop across the valve seat.

19. The pressure regulator as defined in claim 15 wherein said regulating means includes a bellows interposed between said first and second portions, at least one of said first and second portions having an outer peripheral portion closely received in said bellows to provide support therefor under high pressure conditions.

20. A pressure regulator comprising:
a housing having a chamber defined therein;
an inlet and outlet operatively communicating with said chamber;
means for selectively regulating fluid flow between said inlet and outlet, said regulating means including a poppet assembly that opens and closes one of said inlet and outlet;
means for connecting said poppet assembly to said regulating means, said connecting means permitting selective movement therebetween; and
means for limiting rotational movement between said resilient means and said poppet assembly, said rotational limiting means being defined by a generally rectangular end on said poppet assembly received in a generally rectangular cavity in said connecting means.

21. The pressure regulator as defined in claim 20 wherein said connecting means is fixedly secured to said regulating means along an outer radial portion and retains said poppet assembly along a radial inner portion.

22. The pressure regulator as defined in claim 20 wherein said connecting means includes an opening adapted to receive said poppet assembly therethrough, said opening being sized to permit lateral movement of said poppet assembly relative to said regulating means.

23. The pressure regulator as defined in claim 20 further comprising means for dampening movement of said regulating means to limit oscillations thereof under selected conditions.

24. The pressure regulator as defined in claim 23 wherein said regulating means includes first and second portions adapted for movement relative to one another, said dampening means including a resilient member interposed between said first and second portions.

25. A pressure regulator comprising:
a housing having a chamber defined therein;
an inlet and outlet operatively communicating with said chamber;
means for selectively regulating fluid flow between said inlet and outlet, said regulating means including a closed cavity defined in the chamber having a predetermined pressure charge therein that establishes the opening and closing pressure value of the regulator, the regulating means further including a movable pressure responsive member having a first portion secured in the chamber, a second portion associated therewith and adapted for movement relative to the first portion, and a bellows interposed between the first and second portions having an outer peripheral portion closely received in the bellows to provide support therefor under high pressure conditions, and means for dampening movement of said regulating means to limit oscillations thereof under selected conditions.

* * * * *

UNITED STATES PATENT AND TRADEMARK OFFICE
CERTIFICATE OF CORRECTION

PATENT NO.   : 5,033,505
DATED        : July 23, 1991
INVENTOR(S)  : Paul G. Eidsmore It is certified that error appears in the above-identified patent and that said Letters Patent is hereby corrected as shown below:

Title page item (73):

identifies Nupro Company as assignee.

Signed and Sealed this

Ninth Day of February, 1993

Attest:

STEPHEN G. KUNIN

*Attesting Officer*       *Acting Commissioner of Patents and Trademarks*